June 27, 1939.  D. W. BURT  2,163,827
ANIMAL TRAP
Filed Jan. 15, 1938  2 Sheets-Sheet 1
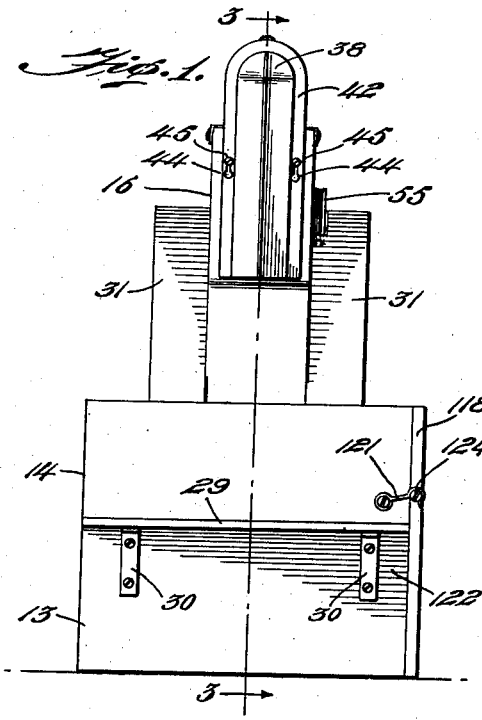
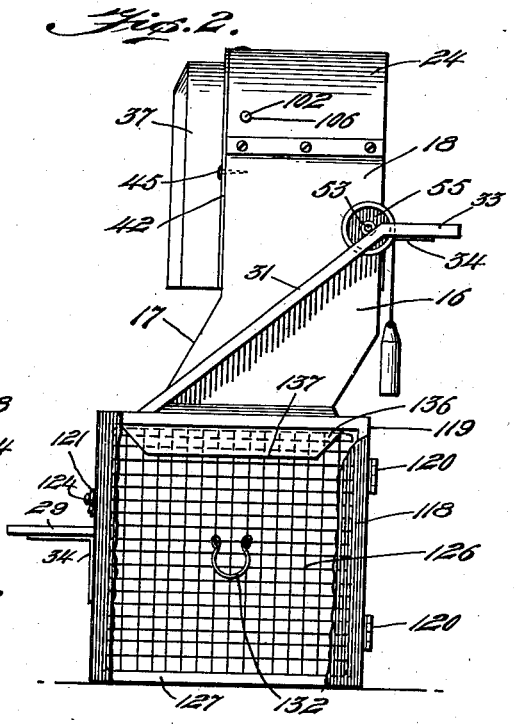
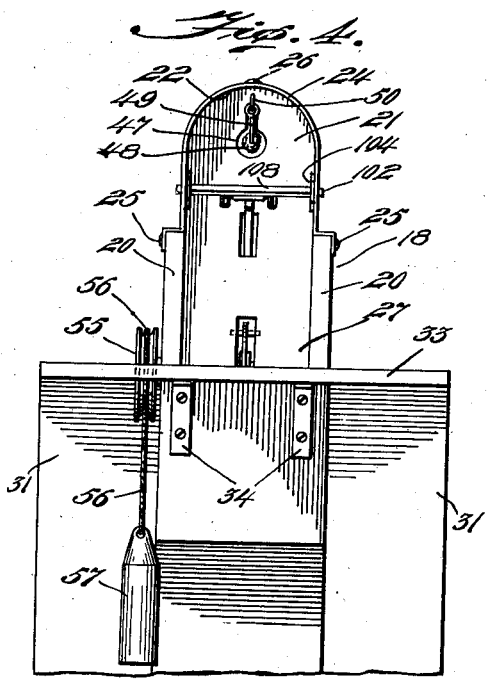
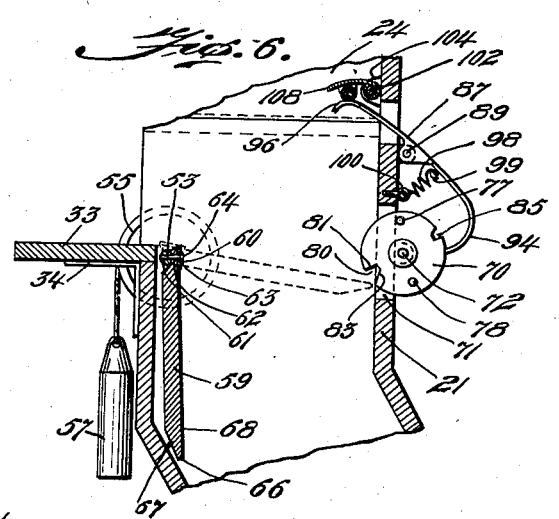
Inventor
Daniel W. Burt
By Horatio E. Bellows
Attorney

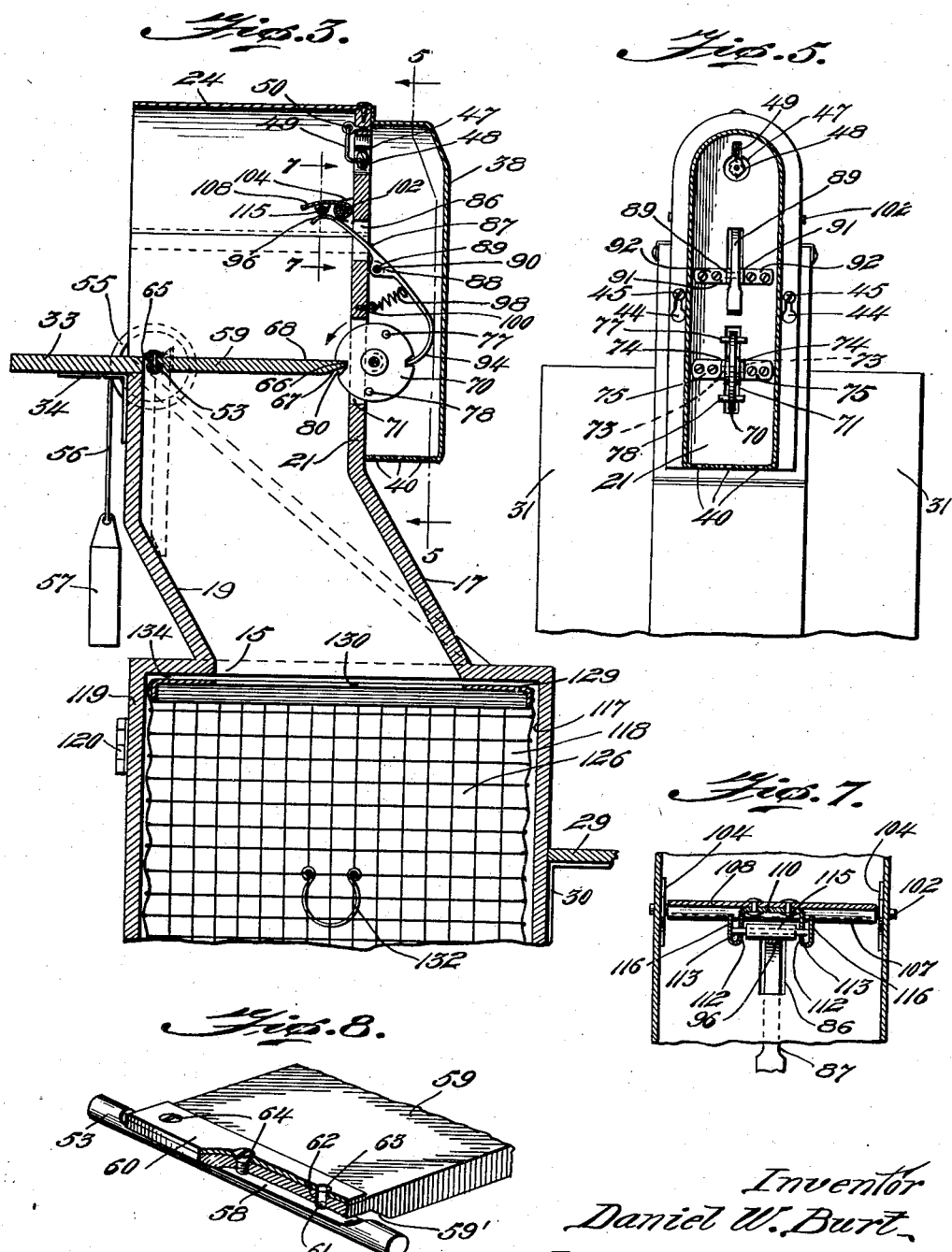

Patented June 27, 1939

2,163,827

UNITED STATES PATENT OFFICE 2,163,827

ANIMAL TRAP

Daniel W. Burt, Providence, R. I.

Application January 15, 1938, Serial No. 185,187

14 Claims. (Cl. 43—74)

My invention relates to devices adapted to trap rats, mice and other rodents.

The essential objects of my invention are to entice the animal sought from a distance to the operating mechanism; to facilitate approach to the bait; to render the actuation of the operating mechanism extremely sensitive; to insure certain and speedy action of the tripping and locking mechanism; to provide means for shunting the rodent into the cage painlessly; to afford a compact and convenient arrangement of the cage in the housing; and to prevent accidental escape of the rodent from captivity.

Other objects and advantages of my invention will be hereinafter adverted to in the specification and be included in the claims.

To all the above recited ends my invention consists in such parts and in such combinations of parts as fall within the scope of the appended claims.

In the accompanying drawings, which disclose an illustrative form of my invention, and the form thereof at present preferred by me, Figures 1 and 2 are a front and side elevation, respectively, of my trap.

Figure 3, an enlarged vertical section of the same taken on line 3—3 of Figure 1, showing the parts in locked position, Figure 4, an enlarged fragmentary rear elevation of the same, Figure 5, a section on line 5—5 of Figure 3, Figure 6, a partial section on line 3—3 of Figure 1 showing the operating parts in released position, Figure 7, a partial section on line 7—7 of Figure 3, and Figure 8, a fragmentary perspective view of the trap door, Like reference characters indicate like parts throughout the views.

As herein shown my trap includes a casing 13 comprising a box or base 14 provided with a central opening 15 in its top, and a transversely rectangular stack 16 provided with a rearwardly and upwardly inclined offset lower portion 17 surrounding the opening 15, and a vertical upper portion 18. As shown in Figure 4 the rear wall 19 of the stock portion is shorter than the side walls 20 of the same; and the front wall 21 thereof is higher than the side walls and terminates in a curved upper edge 22, all as shown in Figure 4. An arched metallic hood 24 attached by screws 25 and 26 to the walls 20 and 21, respectively, constitutes the top of the stack portion 18; and its open rear end registers with the rectangular opening formed by the difference in heights between the side walls and rear wall of the housing to form an entrance opening 27 in the rear of the stack portion 18.

The casing carries a runway which includes a step 29 supported by brackets 30 upon the front of the box 14, upwardly and rearwardly inclined guideways 31 upon the sides of the stack extending from the top of the box; and a platform 33 supported by brackets 34 upon the rear wall of the stack and constituting a threshold for the entrance opening 27.

Detachably mounted upon the front of the stack portion 18 is a metallic housing 37 comprising an elongated forwardly extending body 38 open at its back and provided in its lower end with odor disseminating perforations 40, and a peripheral attaching flange 42 upon its rear margin provided with vertically disposed key-hole slots 44 for the reception of screws or pins 45 passing loosely through the latter and fixed to the front of the stack portion 18. In an opening 47, in the front portion of the stack wall 21, as shown in Figures 3 and 4, is a piece of cheese 48 or other bait suspended upon a hook 49 loosely depending from an eye screw 50 fixed in the wall above the opening. This opening cooperates with the perforations 40 to permit circulation of the odor impregnated air through the housing and serve as an enticement to an animal at some distance away from the front of the trap casing.

A rock shaft 53 is journaled in the side walls of the stack portion 18 at a point adjacent the inner edge of the platform, as shown in Figure 3, and has fixed to its end a grooved wheel or pulley 55 over whose periphery passes a cord 56 knotted at its inner end through a peripheral perforation, not shown, to the wheel, and attached at its outer end to a weight 57. As shown in Figures 3, 6 and 8 the upper face of an intermediate portion of the rock shaft 53 is flat, as at 58, and the lower rear margin of a trap door 59 is recessed, as at 59', to receive the flat portion of the shaft, and upon the top of the door rests a transversely disposed metallic strip 60; the shaft, door, and strip being provided with series of registering holes 61, 62, and 63 respectively to receive binding screws 64. The upper face of the door is normally in the plane of the platform 33 with its rear edge 65 abutting against the latter to form a stop against excessive elevation of the door under the influence of the weight 57. The forward edge 66 of the door is formed with a bevel 67 upon its lower face disposed at an acute angle to the plain unbeveled upper face 68 of said edge, as shown in Figures 3 and 6.

Cooperating with the trap door is a rockable locking disk 70 extending through a vertical slot 71 in the front wall 21 of the stack portion 18, having a shaft 72 mounted in perforations 73 in forwardly extending lugs 74 upon attaching plates 75 fixed to the front of the wall 21, as shown in Figure 5. Upper and lower marginal stop pins 77 and 78 are interspaced from each other less than 180 degrees upon portions of the disk in front of the housing wall 21.

An angular peripheral cavity 80 is provided in that portion of the edge of the disk 70 behind the wall 21 of the stack. The cavity is bounded or defined by an upper edge or shoulder 81 radially disposed to the disk, and a lower edge or shoulder 83 nonradially or obtusely disposed to the upper shoulder, as shown in Figure 6. Diametrically opposite the cavity 80 is a peripheral notch or recess 85. The forward edge of the door 59 is normally located in the cavity 80, as shown in Figure 3.

Above and in vertical alignment with the slot 71 is an upright slot 86 through which loosely passes an upwardly and rearwardly inclined locking lever or detent 87 in whose intermediate portion 88 is fixed a pivot pin 89 loose in perforations 90 in lugs 91 upon attaching plates 92 upon the front face of the stack wall 21, as shown in Figures 3 and 5. The lower end of the detent 87 consists of a rearwardly directed tooth 94 adapted to engage the periphery of the disk 70 and register in the notch 85. The upper end of the detent consists of a rearwardly directed arched cam finger 96. The detent is pressed against the disk by means of a helical spring 98 fixed at one end to a pin 99 upon the intermediate portion of the lever, and at its other end to a pin 100 fixed to the adjacent wall of the stack.

The detent 87 is actuated by a tripping device including a pivot pin 102 journaled in bearings 104 engaging the sides of the metallic hood 24 and, in this instance, extending also through perforations 106 in said sides. A sleeve 107 rigidly fixed to the pin is integral with a horizontal plate 108. As shown in Figure 7 a plate 110 is fixed to the first plate and has depending lugs 112 provided with perforations 113 to loosely receive the reduced ends of a roller 115 adapted to loosely abut against upturned ears 116 integral with the lower ends of the lugs. The roller 115 rests upon, and transversely of, the convex surface of the finger 96 of the locking lever.

The box or base 14 of the casing includes an open side 117 closed by a door 118 connected to the back 119 by hinges 120, and fastened by a hook 121 upon the front 122 of the box to a pin 124 upon the door. A rectangular cage 126 is slidable upon the floor 127 of the box. The cage is of wire except that the top 129 is of metal, and is provided with a central rectangular opening 130 in vertical alignment with the opening 15 in the top of the box. A pendant handle 132 is attached to the front of the cage to facilitate removal of the latter. There exists a space 134 between the top 129 of the cage and the top of the box to slidably accommodate a rectangular plate 136 having a depending flange 137 upon its front edge by which flange the plate may be inserted or removed from the box at will to close or disclose the opening 130 in the top of the cage.

In operating my device the animal, induced by the odor disseminated through the housing 37, leaps upon the step 29 and thence up the guideways 31 to the platform 33 and upon the trap door 59, whereupon he rises upon his hind legs and rests his fore feet upon the plate 108 while he attempts to reach the bait upon the hook 49. The pressure on the plate tilts the lever 87 to disengage the hook 94 from the notch 85 which permits the disk 70 to move in the direction of the arrow until the stop pin 77 contacts with the stack wall 21, as shown in Figure 6. This movement releases the door 59 from the cavity 80 and permits the door to collapse under the weight of the animal to the full line position shown in said figure.

When relieved of the weight of the animal the door 59 swings upwardly under the influence of the weight 57 until its edge 66, because of the lowered position of the shoulder or edge 83, is permitted to enter the cavity 80 and upwardly strike the disk shoulder or edge 81, whereby the disk is turned in the direction opposite the arrow until the stop pin 78 abuts against the stack wall and the lever hook 94 reenters the notch 85.

The animal, when precipitated from the trap door in his descent, first contacts the offset portion 17 of the stack and is thence humanely shunted thereby into the cage 126 through the opening 130, at which time the closure plate 136 is absent, but may be subsequently manually inserted to prevent escape from the cage when desired.

I claim:—

1. In an animal trap, a casing, a disk pivotally mounted in the casing provided with a cavity, a rock shaft mounted in the casing opposite the disk, a trap door fixed at one end to the shaft and having its opposite end normally extending in the cavity of the disk, means for normally locking the disk against rotation, means for unlocking the disk to release the door from the disk under the influence of downward pressure upon the door, and gravity means acting upon the shaft for elevating the door to its original position of engagement with the disk, and for rotating said disk in a direction opposite to its first movement by engagement with the free end of the door in being elevated to its original position.

2. In an animal trap, a casing provided in one side with an entrance opening, a rockable disk pivotally mounted upon the opposite side of the casing and provided with a cavity, a vibratory trap door pivotally supported at one end by the casing adjacent the opening and with its other end registering in the cavity, said door being adapted under downward pressure to move the disk in one direction to permit escape of the door from the cavity, and gravity means for elevating the door to move the disk in a direction opposite to its first movement to return the door into the cavity.

3. In an animal trap, a casing, a rock shaft mounted in the casing, a wheel fixed to the shaft, a weight depending from the wheel, a rockable disk pivotally mounted in the casing opposite the shaft provided with a peripheral cavity, a trap door fixed at one end to the shaft extending into the cavity, said door being adapted under downward pressure to move the disk in one direction to permit escape of the door from the cavity, and after cessation of the pressure to be returned to the cavity by the movement of the weight.

4. In an animal trap, a casing, a trap door disposed transversely of the casing and pivotally supported at one end in the casing, a rockable disk pivotally mounted in the casing provided with a peripheral cavity bounded by angularly inclined shoulders and adapted to receive the free end of the door, means for normally locking the disk against rotary movement in either direction, means for releasing the disk to permit the escape of the door from the cavity under downward pressure, and means for returning the door to original engaged position.

5. In an animal trap, a rockable disk pivotally mounted in the casing provided with a peripheral cavity, and with a peripheral notch, a trap door pivotally supported in the casing opposite the disk engaging the disk in the cavity, a detent pivotally mounted in the casing normally registering at one end in the notch to maintain the disk against rotary movement, and tripping means mounted in the casing in contact with the other end of the detent for disengaging the detent from the notch to permit the disk to release the door from the cavity.

6. In an animal trap, a rockable disk pivotally mounted in the casing provided with a peripheral cavity, and with a peripheral notch, a vibratory trap door pivotally mounted in the casing opposite the disk and normally engaging the disk in the cavity, a yieldable detent pivotally mounted in the casing normally registering at one end in the notch to maintain the disk against rotary movement, and means in the casing engageable with the other end of the detent for tripping the detent to permit rocking movement of the disk to successively release the door from the cavity and receive the same into the cavity.

7. In an animal trap, a casing provided with a vertical slot, a rockable disk provided with a peripheral cavity pivotally supported in the slot, a vibratory trap door pivotally supported at one end in the casing opposite the disk with its other end registering in the cavity, said door being adapted under downward pressure to circularly move the disk in one direction, and adapted under a release of pressure to circularly move the disk in a direction opposite its first movement, and lateral stop projections upon the disk adapted to contact with the casing to prevent overrotation of the disk in either direction.

8. In an animal trap, a rockable disk pivotally mounted in the casing provided with a peripheral cavity, and with a peripheral notch, a trap door pivotally mounted in the casing opposite the disk and normally supported by the disk in the cavity, a detent pivotally mounted intermediate its length in the casing adjacent the disk, a tooth upon one end of the detent normally registering in the notch, a cam upon the opposite end of the detent, and tripping means normally in contact with the cam for tilting the detent to release the tooth from the notch.

9. In an animal trap, a casing, a disk pivotally mounted in the casing provided with a peripheral cavity, and with a peripheral notch, a trap door loosely mounted in the casing opposite the disk extending into the cavity, a tiltable detent pivotally mounted intermediate its length in the casing above the disk normally registering at one end in the notch to maintain the disk against circular movement, a pivot pin journaled in the casing adjacent the upper end of the detent, a plate supported by the pivot pin and rigid therewith, depending spaced lugs carried by the plate, and a roller rotatably mounted in the lugs engaging the upper end of the detent and adapted under pressure to tilt the detent and release the disk.

10. In an animal trap, a casing including a box, a stack upon the box communicating therewith and provided with an entrance opening, a runway including a step upon the box, inclined guideways upon the stack, and a platform upon the stack at the opening, a trap door pivotally mounted in the stack adjacent the platform and opening, and a bait support in the stack above the door.

11. In an animal trap, a box provided with an opening in its top, a stack comprising an inclined offset lower portion surrounding the opening, and a vertical upper stack portion provided with an entrance opening, a trap door downwardly collapsible by the weight of an animal and pivotally supported in the upper portion of the stack in vertical alignment with the offset lower portion of the stack, and a bait support in the upper stack portion above the door.

12. In an animal trap, a casing including a box provided with an opening in its top, an upright stack supported by the box around the opening and provided with an entrance opening, a trap door downwardly collapsible by the weight of an animal and pivotally supported by the stack adjacent the entrance opening and in vertical alignment with the first opening, a cage slidably mounted in the box provided with an opening in its top in vertical alignment with the first mentioned opening, and a lateral pendant handle upon the cage.

13. In an animal trap, a casing including a box provided with an opening in its top and with a doorway in its side, a stack upon the box surrounding the opening and provided wtih an entrance opening, a trap door downwardly collapsible by the weight of an animal and pivotally supported by the stack, a cage in the box slidably movable through the doorway and provided with an opening in vertical alignment with the first mentioned opening, and spaced from the box, and a closure plate slidably mounted in the space between the cage and the box.

14. In an animal trap, a casing including a box, a stack upon the box communicating therewith comprising a front, a back, and sides, said back being provided with an entrance opening, and said front being provided with a bait opening, means upon the front adjacent the last mentioned opening for supporting the bait, a trap door pivotally mounted in the sides of the stack below the bait opening and adjacent the entrance opening, a runway including a step upon the front of the box, upwardly inclined guideways upon the sides of the stack and a platform upon the back of the stack adjacent the entrance opening, and a housing detachably mounted upon the front wall of the housing enclosing the bait opening and provided in its lower portion above the box with perforations for the escape of air.

DANIEL W. BURT.